March 2, 1937.   F. R. LABIN   2,072,308
METHOD OF MAKING GEAR WHEELS
Filed May 16, 1934
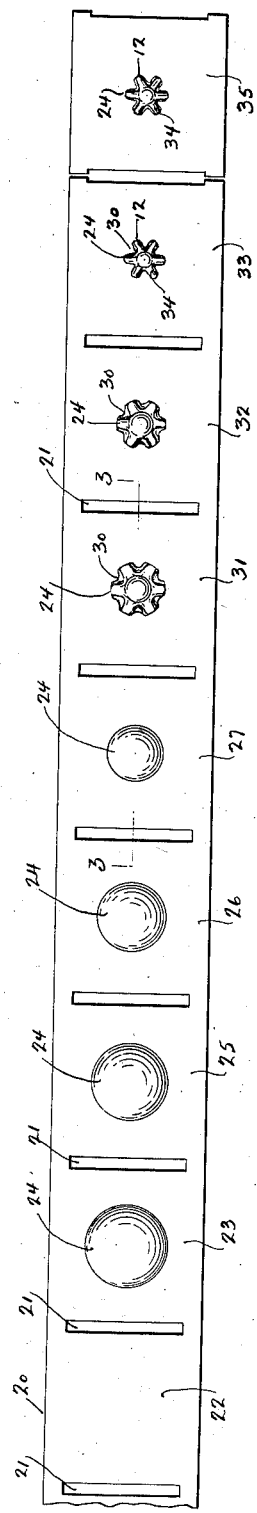
Fig. 1.
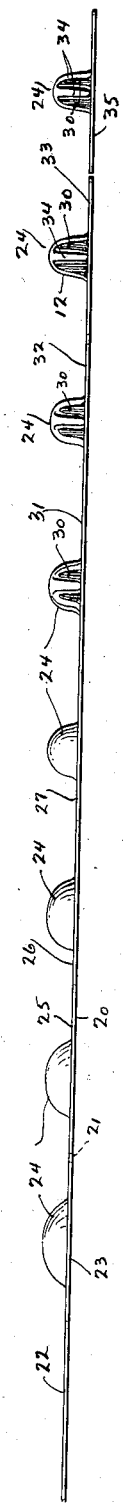
Fig. 2.
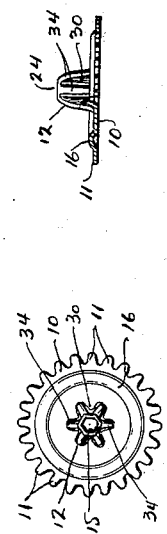
Fig. 5.
Fig. 4.
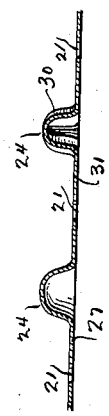
Fig. 3.
INVENTOR
FRANK R. LABIN
By  J.W. Ellis
ATTORNEY Patented Mar. 2, 1937

2,072,308

UNITED STATES PATENT OFFICE 2,072,308

METHOD OF MAKING GEAR WHEELS

Frank R. Labin, Buffalo, N. Y.

Application May 16, 1934, Serial No. 725,947

2 Claims. (Cl. 29—159.2)

My invention relates in general to gear wheels, and in particular to a method of making an integral gear wheel and pinion.

It is well known to those skilled in the art that in gear trains the pinion which is to be rotated with a larger gear is usually made in a separate piece and mounted upon the same shaft as the larger gear or it is made of separate pieces attached to the larger gear, a portion of it being carried by the same shaft which carries the larger gear.

In the manufacture of gear wheels of this general type which are used in the construction of toys, the present method of manufacture is a costly one, requiring the manufacture of many metal parts and involving considerable time in assembling these parts in a combined gear, pinion and attached shaft.

One of the principal objects of my invention has been to provide a method of making gears of this type in which the pinion shall be made from the same piece of material.

Moreover, my method is such that a combined gear and pinion may be made from sheet metal and therefore be very inexpensively produced.

With these objects in view, my method consists in taking a strip of material of the desired thickness and proper width and successively forming thereon a number of protuberances, each succeeding protuberance being smaller in diameter and greater in heighth. The material of the sheet is, after having been drawn up into a protuberance of proper size, formed with a number of equidistantly arranged radial indentations, whereby the teeth on the pinion are initially prepared. These indentations are made deeper as the protuberance is being formed to the final shape and size, and the pinion is completed when the radial indentations are finally formed to the desired depth in the last operation thereon. The blank, bearing the completed pinion, is then cut off from the strip and the article is subsequently completed by stamping the blank with a die designed to form the larger gear with teeth thereon. During the same operation, the pinion is pierced with a hole of the required size and shape to fit the driving shaft (not shown). In the accompanying drawing I have shown a gear formed by my method and also have shown a strip of material illustrating the forming of the protuberances and the indentations in the carrying out of my method. In the drawing:

Fig. 1 is a plan view of a strip of material showing the various steps of my method.

Fig. 2 is a side elevation thereof.

Fig. 3 is a longitudinal, sectional elevation of a portion of the strip and is taken on line 3—3 of Fig. 1.

Fig. 4 is a plan view of the finished article.

Fig. 5 is an elevation, partly in section, of the finished gear.

As shown in Figs. 4 and 5, the gear 10, formed by my method has suitable teeth 11 formed on its periphery and an integral pinion 12 formed at the center of the gear. This pinion is provided with a number of teeth 34 formed by radial indentations or grooves 30 pressed in the metal forming the pinion. An aperture 15 is provided in the pinion 12 which is preferably polygonal in shape so that a shaft of the same shape (not shown) may be slipped into the aperture, which shaft will serve to drive the pinion without the additional means for securing the shaft to the combined gear and pinion. The gear is also provided with an annular re-inforcing ridge 16, formed in the material of the gear.

Referring to Figs. 1-3 inclusive, 20 represents the strip of sheet metal used in carrying out my method and from which the gear and pinion are to be made. This strip is run through suitable punches and dies and slots 21 are first pierced in the strip in well known periodic manner as the strip is being fed along through the dies used in carrying out my method. After two of the slots 21 are made, a blank 22 is formed as shown at the left of the strip in Figs. 1 and 2. The next stage of operation is that shown at 23 where a cup-shaped protuberance 24 is shown. This is the first step in the drawing of the metal, and since this protuberance is the first drawing it is of relatively large diameter and slight height. The next successive steps are shown at 25, 26, and 27. The protuberance 24 formed in each of these steps progressively decreases in diameter and increases in height. When the protuberance has reached the size of that indicated in step 27, it is ready to receive the initial radial indentations 30 in the formation of the pinion as shown in step 31. In step 31 the diameter of the protuberance is slightly decreased and the height thereof is slightly increased. In step 32 the drawing action is continued so that the protuberance is smaller in diameter and higher, and during this step the radial indentations 30 are more deeply formed. When the step 33 is reached, the drawing has been completed and the protuberance is of the correct diameter and the radial indentations 30 are of sufficient depth to properly form the teeth 34 of the pinion. In the next step of the operation the blank 35, having the finished pinion 12, is severed from the strip, as shown in Figs. 1 and 2 and is ready for subsequent operations.

The finished blank 35 is then placed in a suitable die (not shown) which, in one or more operations, cuts the teeth 11 with which the finished gear is to be provided and forms the annular reinforcing ring 16. The gear pinion is also pierced in providing the shaft hole 15. As hereinbefore pointed out, this shaft (not shown), and therefore the hole, is preferably of polygonal shape so that a mere assembling of the shaft and combined gear and pinion will provide the necessary driving connection between such shaft and the pinion, whereby no further operations need to be performed to attach the gear to the drive shaft.

While my method may be carried out in the formation of the strip as shown, by means of a series of independent dies, I have found in practice that these steps may preferably be made progressively and successively by means of a gang die. Inasmuch as dies used for these purposes are not a part of my invention, I have shown only the formation of the combined gear and pinion from its initial step to its final completion, omitting all illustrations of the die or dies used.

Having thus described my invention, what I claim is:

1. A method of making a combined gear and pinion comprising the provision of a work strip, slitting the work strip periodically at equidistant points in the strip, thereby forming a a series of united blanks, drawing a cup-shaped protuberance from each blank in successive stages while the blanks are still united, successively forming radial indentations in the protuberance of each blank coincidentally with the steps which bring the protuberance to its desired size, and then forming the teeth on the outside periphery of the gear and a central aperture in the pinion by a punching operation.

2. A method of making a combined gear and pinion comprising the provision of a work strip, slitting the work strip periodically at equidistant points in the strip, thereby forming a series of united blanks, drawing a cup-shaped protuberance from each blank in successive stages while the blanks are still united, successively forming radial indentations in the protuberance of each blank, and then forming the teeth on the outside periphery of the gear and a central aperture in the pinion by a punching operation.

FRANK R. LABIN.